US006970086B2

(12) United States Patent
Nelson

(10) Patent No.: US 6,970,086 B2
(45) Date of Patent: Nov. 29, 2005

(54) WIDE AREA METAL DETECTION (WAMD) SYSTEM AND METHOD FOR SECURITY SCREENING CROWDS

(75) Inventor: Carl V. Nelson, Derwood, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/280,842

(22) Filed: Oct. 25, 2002

(65) Prior Publication Data
US 2003/0080868 A1    May 1, 2003

Related U.S. Application Data

(60) Provisional application No. 60/346,834, filed on Oct. 25, 2001, provisional application No. 60/403,857, filed on Aug. 15, 2002.

(51) Int. Cl.[7] ............................................. G08B 13/24
(52) U.S. Cl. .................. 340/551; 324/243; 340/572.4; 340/572.7; 348/143
(58) Field of Search ............................ 340/551, 572.1, 340/572.4, 572.6, 941, 933, 572.7, 539.13, 340/825.49; 324/228, 243; 348/143, 156, 348/169

(56) References Cited

U.S. PATENT DOCUMENTS

| 3,686,564 | A | * | 8/1972 | Mallick, Jr. et al. ......... 324/243 |
| 4,012,690 | A | * | 3/1977 | Heytow ....................... 324/243 |
| 4,135,184 | A | | 1/1979 | Pruzick |
| 4,308,530 | A | | 12/1981 | Kip et al. |
| 4,635,041 | A | | 1/1987 | Maimann et al. |
| 4,782,342 | A | * | 11/1988 | Walton ......................... 340/941 |
| 5,121,105 | A | * | 6/1992 | Aittoniemi ................. 340/572.1 |
| 5,459,451 | A | * | 10/1995 | Crossfield et al. ......... 340/572.1 |
| 5,790,685 | A | | 8/1998 | Sallee |
| 2003/0016131 | A1 | * | 1/2003 | Nelson ......................... 340/551 |
| 2003/0052783 | A1 | * | 3/2003 | Sitzman ..................... 340/572.7 |

FOREIGN PATENT DOCUMENTS

| DE | 24 37 797 | 2/1976 |
| EP | 0 831 339 A2 | 3/1998 |
| FR | 2.076.468 | 9/1971 |

* cited by examiner

Primary Examiner—Thomas Mullen
(74) Attorney, Agent, or Firm—Francis A. Cooch

(57) ABSTRACT

A Wide Area Metal Detection (WAMD) system and method for security screening a crowd of people is provided. The system comprises at least one Magnetic Field Generator (MFG), e.g., a Horizontal Magnetic Field Generator (HMFG) buried below a walking surface for generating a magnetic field, a plurality of magnetic field sensors located within the sensing area of the MFG for sensing a metallic object, based on eddy currents in the magnetic field, and a location indicator for indicating a location of an individual with the metallic object at a position corresponding to that of one of the plurality of magnetic field sensors that sensed the metallic object. At least one video camera is included for identifying the individual at the location indicated by the location indicator and tracking further movements of the individual.

21 Claims, 8 Drawing Sheets

GENERAL SYSTEM OVERVIEW

WIDE AREA METAL DETECTION (WAMD) SYSTEM AND METHOD FOR SECURITY SCREENING CROWDS

CROSS-REFERENCE TO RELATED APPLICATIONS

This application claims the benefit of prior filed U.S. Provisional Application No. 60/346,834, filed on Oct. 25, 2001 and U.S. Provisional Application No. 60/403,857, filed on Aug. 15, 2002, the contents of which are incorporated by reference herein.

BACKGROUND OF THE INVENTION

1. Field of the Invention

The present invention relates generally to a metal detection system and method, more particularly to a Wide Area Metal Detection (WAMD) system and method for security screening crowds of people.

2. Description of the Related Art

Metal detectors are used for security purposes in a number of locations, such as airports, sporting events, concerts, amusement parks, federal buildings, banks, schools and other high-security installations. Commonly, there are two types of metal detectors in use in such installations. The first type includes a transmitting coil located on one side of the detector and a receiving coil located on the opposite side of the detector. Typically, a magnetic field is generated on one side of the detector by the transmitting coil, and the generated field is received on the other side of the detector by the receiving coil. As long as the magnetic field received by the receiving coil is within the predetermined parameters programmed into the detector, an alarm is not actuated. However, the passage or presence of a metallic object through or in the magnetic field causes a disturbance in the field received by the receiving coil. If this disturbance causes the magnetic field to fall outside of the predetermined parameters, the alarm associated with the detector is actuated.

Another type of ferromagnetic metal detector is disclosed in U.S. Pat. No. 3,971,983 to Jaquet. This type of detector employs a number of gradiometers positioned on both sides of a walk-through portal. While this device does not actively generate a magnetic field within the portal, the gradiometers monitor the magnetic field generated by the earth. Any disturbances in the earth's magnetic field, such as may be caused by the presence of a ferromagnetic object within the portal, are detected by the gradiometers, resulting in the activation of an alarm.

While these types of detector systems can be very accurate, typically, the operation of and hardware associated with the systems only allow one person to walk through the metal detector at a time. This creates a "choke point" and a line typically forms. For large sporting events, military checkpoints, border crossings and anywhere where large crowds gather and must be screened for metal weapons or contraband, the use of portable type metal detectors create problems.

Whitehead, et al. U.S. Pat. No. 2,560,834 and Keller U.S. Pat. No. 5,859,532 disclose apparatuses for detecting and locating a buried, metallic object that use a single transmitter loop (Whitehead; vertical magnetic field generator) or a series of transmitter loops (Keller) and a linear, one-dimensional, array of receiver coils (vertical magnetic field receivers). The apparatuses are then moved over the ground to locate buried metal objects. None of these apparatuses are placed under ground, nor do either of these patents disclose a means to track and verify the potential source of the person in a crowd carrying a metal object. In addition, an extensive, two-dimensional array of transmitter loops and receiver loops are needed to track with high confidence a person with metal in a crowd. Such an extensive array over a large area may be expensive and difficult to deploy and maintain.

Goldfine, et al. U.S. Pat. No. 6,144,206 discloses a magnetic transmitter configuration that is more appropriate for a large survey area for buried metal objects (e.g., land mines and unexploded ordnance). Goldfine employs a relatively complex spatial and temporal sampling scheme for the transmitter and receivers to aid in target localization. The Goldfine apparatus has the same problem as the Whitehead and Keller apparatuses for tracking a moving person with metal in a crowd. No provision is made for a combined metal detector and video tracking system.

Accordingly, a need exists for wide-area metal detection screening, which can be used to locate potential people in a crowd that should be investigated further. This pre-screening greatly reduces the need for everyone entering a building or an area to be "scanned" for potential weapons with a high sensitivity portal-type metal detector or a handheld metal detector.

SUMMARY OF THE INVENTION

It is, therefore, an object of the present invention to provide a system and a method for security screening a wide-area of people for metal objects.

To achieve the above and other objects a Wide Area Metal Detection (WAMD) system for security screening a crowd of people is provided. The system comprises at least one Magnetic Field Generator (MFG), e.g., a Horizontal Magnetic Field Generator (HMFG), located below a walking surface for generating a magnetic field, a plurality of magnetic field sensors located within the sensing area of, e.g., above, the at least one MFG for sensing a metallic object, and a location indicator for indicating a location of an individual with the metallic object at a position corresponding to that of one of the plurality of magnetic field sensors that sensed the metallic object.

In another embodiment of the present invention, a WAMD system further comprises at least one video camera for identifying the individual at the location indicated by the location indicator and tracking further movements of the individual, and a video display for displaying images captured by the at least one video camera to security personnel.

A preferred Wide Area Metal Detection (WAMD) method for security screening a crowd of people is also provided. The method comprises directing a traffic pattern of the crowd over at least one buried Horizontal Magnetic Field Generator (HMFG) and a plurality of magnetic field sensors, detecting a presence of a metal object in the crowd utilizing the at least one HMFG and one of the plurality of magnetic field sensors, locating an individual in the crowd with the metal object utilizing a location indicator, and apprehending the individual to perform a more thorough body search and examine the metal object.

In an alternative method, a WAMD method further comprises identifying the individual in the crowd with at least one video camera, after locating the individual, and tracking movement of the individual with the at least one video camera until the individual is apprehended.

Alternatively, a third preferred Wide Area Metal Detection (WAMD) method for security screening a crowd of people is provided. The third preferred method comprises directing a traffic pattern of the crowd over at least one buried Horizontal Magnetic Field Generator (HMFG) and a plurality of magnetic field sensors, monitoring the crowd for suspicious individuals, utilizing at least one video camera, upon identification of a suspicious individual, activating the at least one HMFG below the suspicious individual, determining if a metal object is on the suspicious individual by utilizing the at least one HMFG and one of the plurality of magnetic field sensors, and apprehending the individual to perform a more thorough body search and examine the metal object.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION

A preferred embodiment of the present invention will be described herein below with reference to the accompanying drawings. In the following description, well-known functions or constructions are not described in detail since they would obscure the invention in unnecessary detail.

As described above, the present invention is directed to a Wide Area Metal Detection (WAMD) system and method for security screening crowds of people. The WAMD is designed to assist in pre-screening crowds of people for metal weapons. As such, it is not a stand-alone system that can be used without trained operators and a plan of operation with security people in the monitoring area. What the WAMD system and method provide are ways to focus on potential threats while minimizing the inconvenience to a large number of people.

Figure 1A:
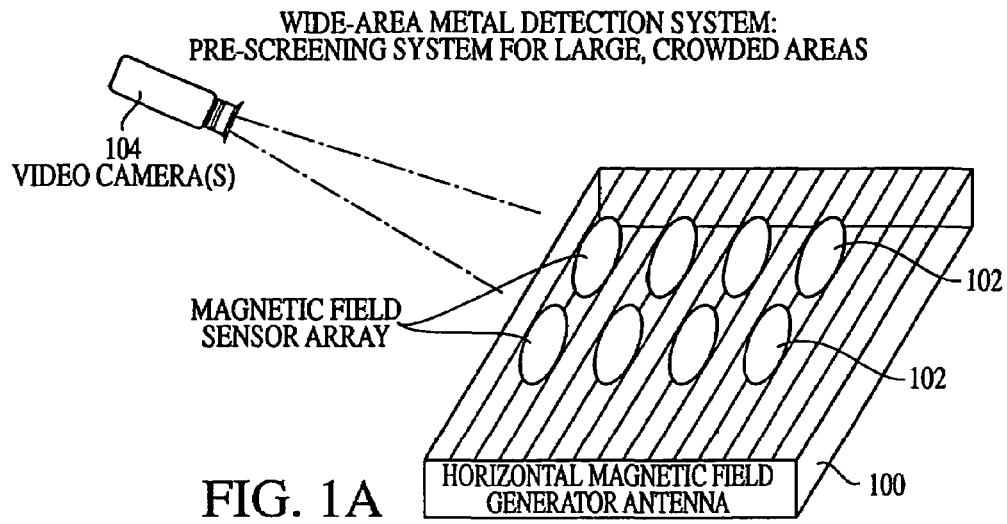
FIGS. 1A and 1B are diagrams illustrating a basic concept and construction of the WAMD system according to a preferred embodiment of the present invention.
Figure 1B:
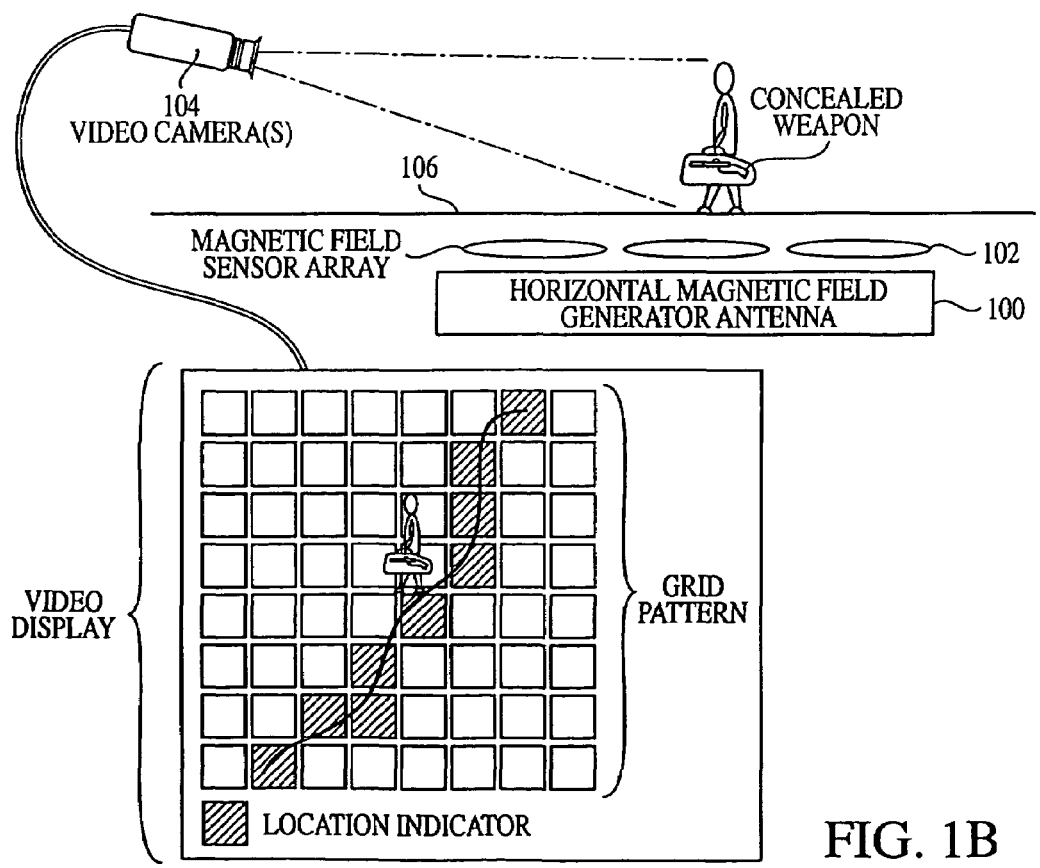

FIGS. 1A and 1B are diagrams illustrating a basic concept and construction of the WAMD system according to a preferred embodiment of the present invention. As illustrated in FIGS. 1A and 1B, the WAMD comprises at least one Magnetic Field Generator (MFG) such as a Horizontal Magnetic Field Generator (HMFG) antenna 100 for generating a horizontal magnetic field, an array of magnetic field sensors 102 for sensing eddy currents produced in the horizontal magnetic field when a metal object is present, and a video camera 104 for identifying an individual holding the metal object.

As noted in the discussion of the prior art, other magnetic field generator configurations are possible. However, one skilled in the art will note the many advantages that are convened by the HMFG used in the present apparatus: (1) magnetic field is relatively uniform in horizontal intensity aiding in target detection and more importantly target classification when the target is moving over the detection area; (2) the magnetic field strength is relatively uniform in height, improving detection sensitivity; (3) the HMFG uses fewer component wires and support electronics compared to multiple transmitter loops for a given area, thus making it less expensive compared to multiple transmitter loops; (4) the bandwidth (the inverse of the turn-off time) of a HMFG, for a given sensitivity is higher than a comparable loop antenna (which is inductance limited due to coil turns and diameter), higher bandwidth implies better target classification potential and sensitivity; and (5) a HMFG transmitter has minimal cross-talk with suitably placed magnetic field receivers thus enhancing sensor sensitivity and construction simplicity. Therefore, the present description of the WMAD apparatus will use the HMFG as the excitation source for the eddy currents. In addition, many different types of magnetic field sensors are possible. For illustrative purposes, simple loop magnetic field sensors will be used in describing the present apparatus.

Preferably, as illustrated in FIG. 1B, the HMFG 100 is buried below a surface of an area to be monitored for weapons (survey area). Along with the HMFG 100, an array of magnetic field detectors 102 is also buried. A non-magnetic surface 106 (such as dirt, gravel, or asphalt) covers the sensor hardware. The surface may or may not be marked with a grid pattern to assist in co-locating the magnetic field and video sensing as will be described later in more detail. The HMFG is powered either by a pulsed current source (i.e., a time domain method) or a continuous wave (CW) current source (i.e., frequency domain method). Either method creates eddy currents in nearby metal objects. It should be noted that although either method is applicable to the present invention, the present invention will for the most part only be described to the pulsed version of the system for ease of explanation. Further, depending on the application, one or both EMI metal detector technologies may be used.

Figure 2:
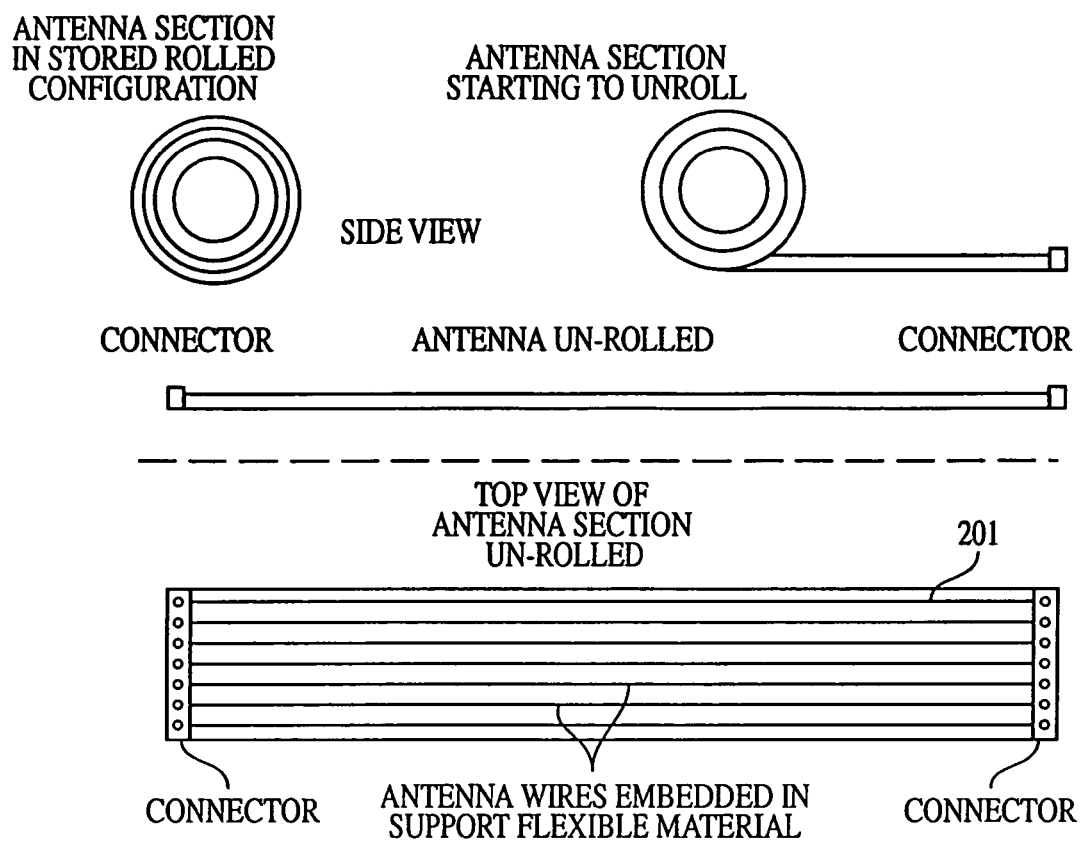
FIG. 2 is a diagram illustrating various views of an HMFG section according to the present invention.

FIG. 2 is a diagram illustrating various views of an HMFG section according to the present invention. A horizontal magnetic field is created with a series of closely spaced current carrying wires 201 configured as the HMFG 100 (transmitter). The details of the theory and construction of the HMFG 100 are described in SPIE AeroSense Conference Proceedings, April 2001 titled "Horizontal Electromagnetic Field Sensor for Detection and Classification of Metal Targets", and for ease of explanation will not be described herein. One skilled in the art will recognize the advantage of the HMFG in regard to a CW or frequency domain magnetic transmitter. A CW metal detector must cancel or buck the primary field of the magnetic field generator in order for the magnetic field sensors to measure or sense the secondary magnetic field of the metal object that is being sensed. As described in the reference cited above, the HMFG has no component of magnetic field in the direction of the sensing axis of a horizontal magnetic field receiver, thus there is no coupling between the transmitter and receiver. Hence, the receiver does not see the primary magnetic field and thus need not be canceled or bucked by compensation circuits or other design considerations.

Figure 3:
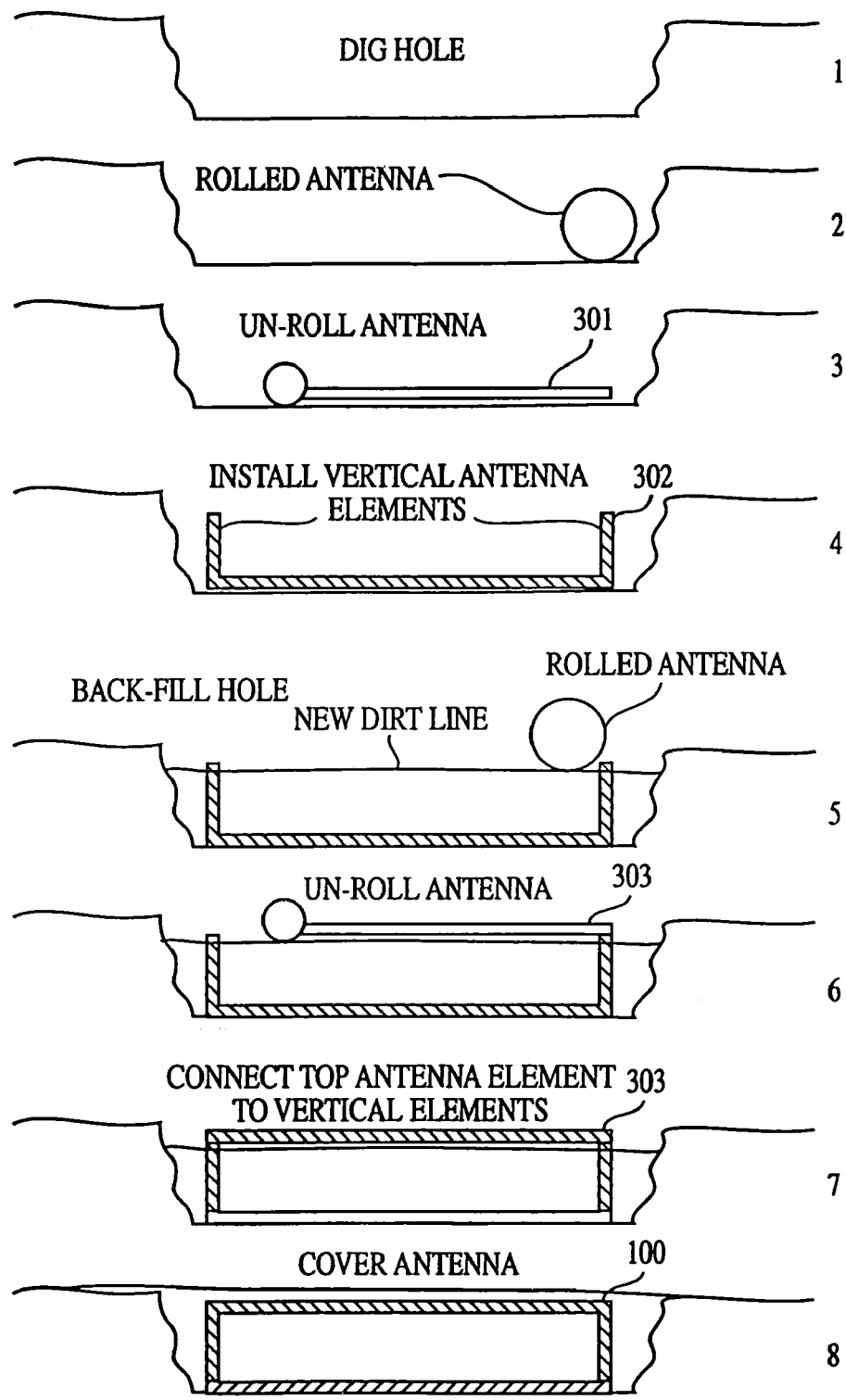
FIG. 3 is a diagram illustrating a procedure for assembling and burying an HMFG.

FIG. 3 is a diagram illustrating a procedure for assembling and burying an HMFG 100. In step 1, a hole is dug that spans the survey area. After the hole is dug, a section of an HMFG 301, as illustrated in FIG. 2, is unrolled as a bottom layer in steps 2 and 3. Then, vertical elements 302 are connected to the bottom section of the HMFG 301. In step 5, the dug area is filled back in, leaving just the top portions of the vertical elements 302 exposed. A top section 303 of the HMFG is then unrolled and connected to the vertical elements, in steps 6 and 7. Finally, the constructed HMFG 100 is covered in step 8. The magnetic field sensors 102, as illustrated in FIGS. 1A and 1B, are then placed over the HMFG 100 and then covered. It should be noted that the magnetic field sensors do not have to be above the HMFG; they can be anywhere within the sensor area of the HMFG.

In operation, any eddy currents generated in a metal object within the survey area are sensed by a magnetic field sensor 102, which then also indicates the position of the metal object. In FIGS. 1A and 1B, the magnetic field sensors 102 are realized as induction coil sensors (receivers), but it is to be understood that other magnetic sensors could also be utilized. If a metal object is detected by the magnetic field sensor 102, its eddy current response can be used to classify the object as to its threat potential (weapon or no weapon). The eddy current response is measured by a data acquisition system, which presents response signatures to an algorithm for metal object classification.

The video camera 104, or multiple video cameras, monitors the survey area. A trained operator monitors the video camera 104 and is cued by the WAMD system as to the location of person/people carrying metal objects that have exceeded a threshold and/or are potential weapons.

In the system illustrated in FIGS. 1A and 1B, the metal detecting sensor array 102 is buried. However, without loss of generality, the array of metal detecting sensors 102 could also be above ground. However, the buried configuration as illustrated in FIGS. 1A and 1B has several advantages, such as providing an un-obstructive view of the screening area by video cameras, and an un-obtrusive or hidden sensor system, which may be important for aesthetic (theme park) or security (military checkpoint) reasons.

Figure 4:
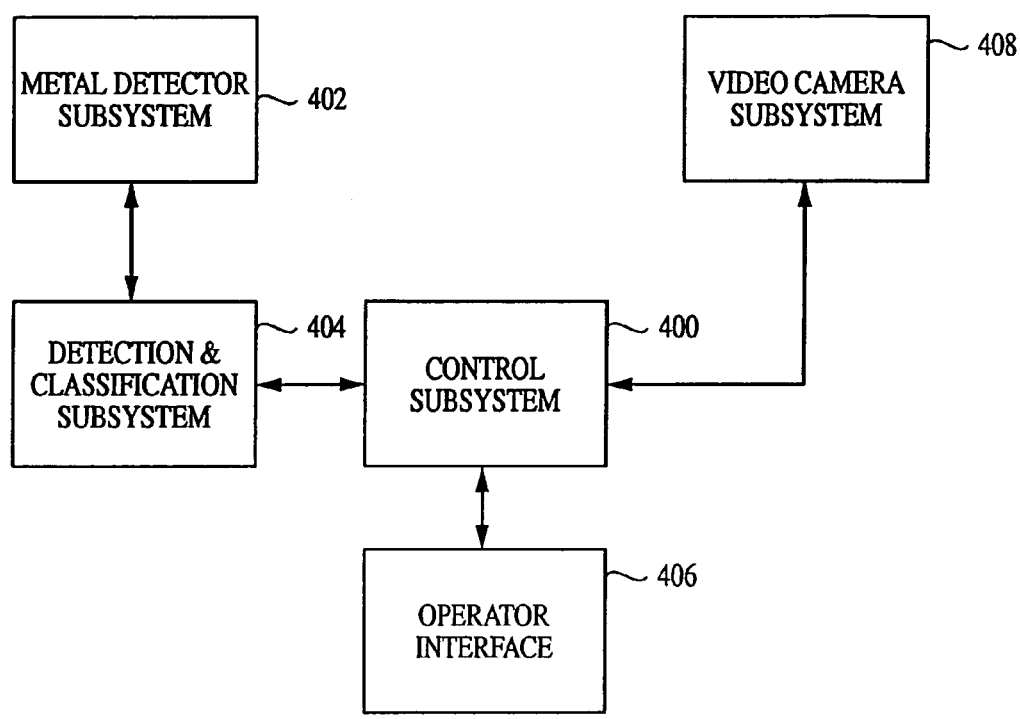
FIG. 4 is a block diagram illustrating the components of a WAMD system according to the present invention.

FIG. 4 is a block diagram illustrating the components of a WAMD system according to the present invention. Generally, a WAMD system comprises a Metal Detector Subsystem 402, which includes the HMFG 100 and the magnetic field sensors 102 illustrated in FIGS. 1A and 1B, a Detection and Classification Subsystem 404, which includes a data processing unit, a Video Camera Subsystem 408 (e.g., one or more video cameras on fixed or pan and tilt platforms), a Control System 400 to interface and control all other Subsystems, and an Operator Interface 406, which includes a location indicator, alarms, video monitors, camera controls, etc. These components will be described in more detail herein below with reference to FIGS. 5 and 6.

Figure 5:
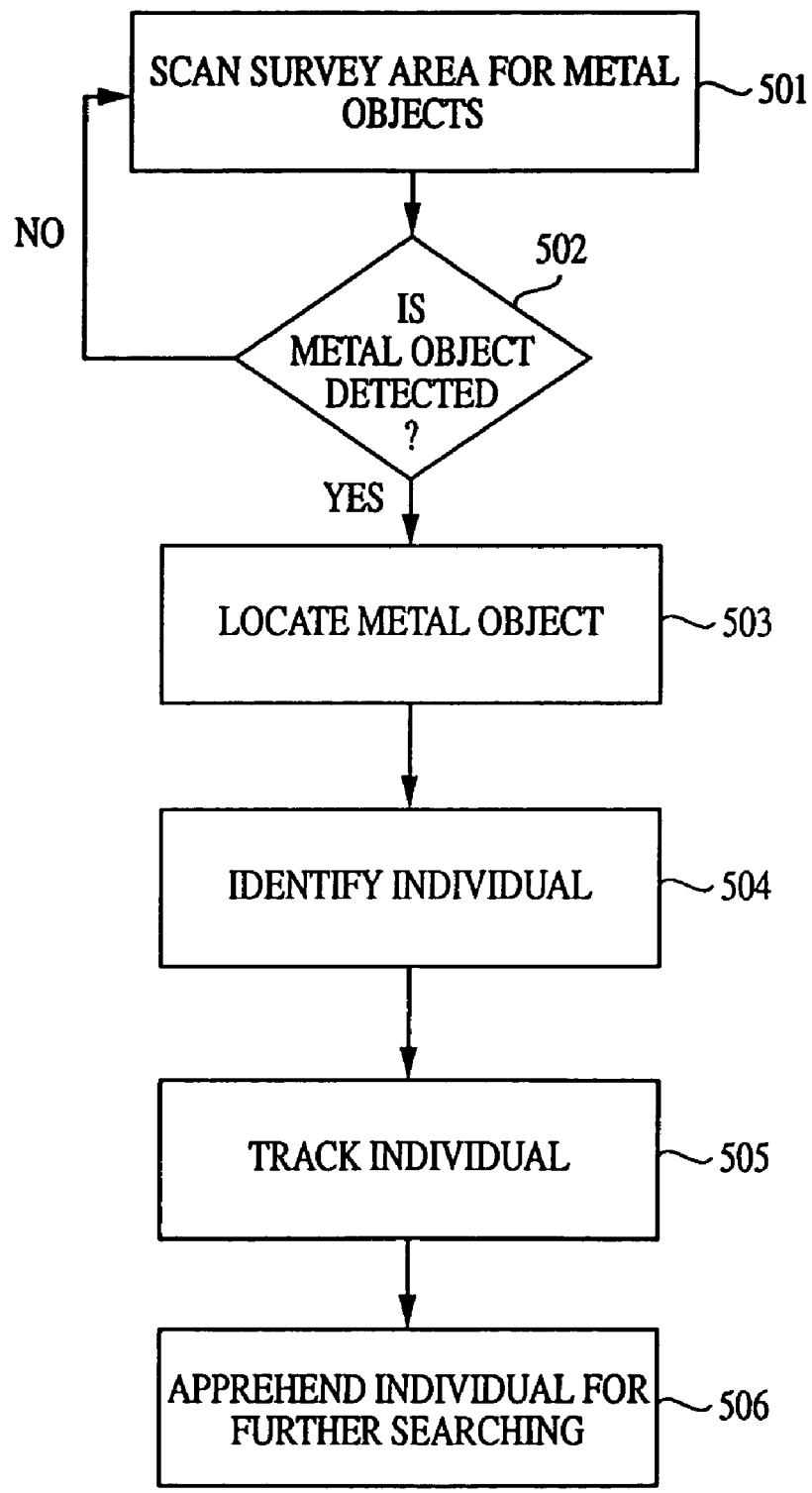
FIG. 5 is a flow chart illustrating a method of operation of a WAMD system according to the present invention.

FIG. 5 is a flow chart illustrating a method of operation of a WAMD system according to the present invention. In FIG. 5, the Metal Detector Subsystem 402, which includes the HMFG 100 and the magnetic field sensors 102 illustrated in FIGS. 1A and 1B, constantly scans the survey area in step 501. In step 502, the Detection and Classification Subsystem 404, determines whether a metal object has been located in the survey area depending on eddy currents in the horizontal magnetic field sensed by the magnetic field sensors 102. If no metal objects are detected in step 502, the WAMD system returns to step 501. If a metal object is detected in step 502, the WAMD system proceeds to step 503.

At this point the Detection and Classification Subsystem 404 is used to determine or classify the type of metal object in order to assist the operator in determining whether the metal object detected poses a threat (e.g., determine whether the metal object is weapon). A system and method for classifying metal targets has been disclosed in a patent application entitled Steerable Three Dimensional Magnetic Field Sensor System For Detection And Classification Of Metal Targets, application Ser. No. PCT/US01/13933, filed Apr. 30, 2002, which was filed by this applicant and is hereby incorporated herein by reference in its entirety.

After detecting a metal object in step 502, the Operator Interface 406 indicates the location of the metal object via the location indicator, which indicates the location of the metal object by identifying the magnetic field sensor 102, which detected the metal object in step 502. After the location of the metal object is determined in step 503, the Control System 400 sends the location information to the Video Camera Subsystem 408 to identify the individual with the metal object in step 504. The video camera subsystem 408 is a single camera or multiple conventional video cameras connected to monitors at the Operator Interface 406 of the system. Aside from conventional viewing and screening of people in the survey area, the video cameras are used to further examine the survey area when a metal object is discovered. The video cameras are equipped with zoom lens and pan and tilt mounts. Accordingly, the video cameras are the used to track the individual in step 505, until the individual is apprehended for further searching in step 506. This tracking process can be performed under the control of the operator or can be performed automatically, utilizing an image recognition software package and program.

Figure 6:
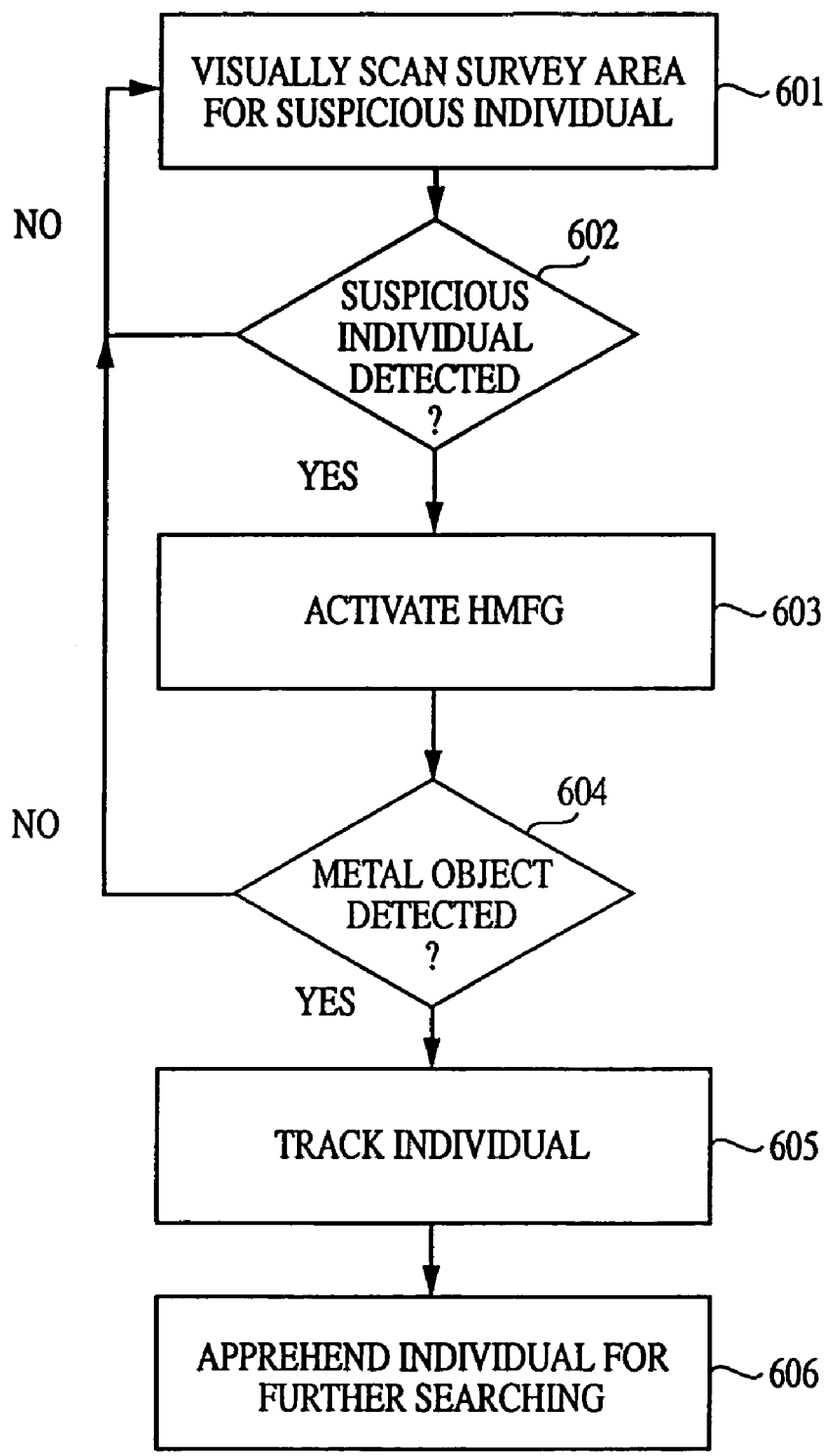
FIG. 6 is a flowchart illustrating an alternate method of operation for a WAMD system according to the present invention.

FIG. 6 is a flowchart illustrating an alternate method of operation for a WAMD system according to the present invention. In step 601, the operator of the system visually monitors the survey area, preferably via the Video Camera Subsystem 408. In step 602, it is determined whether the operator has identified a suspicious individual. If a suspicious individual (e.g., a person wearing a long trench coat on hot summer day) is identified in step 602 the method proceeds to step 603. If no suspicious individual is identified in step 602, the method returns to step 601.

Once the suspicious individual is identified in step 602, the operator activates the Metal Detector Subsystem 402, which includes the HMFG 100 and the magnetic field sensors 102, in the survey area where the individual is located in step 603. Then it is determined in step 604 whether the suspicious individual has a metal object. If no metal object is detected, the method returns to step 601. If there is a metal object in step 604, then the video cameras are the used to track the individual in step 605, until the individual is apprehended for further searching in step 606.

This alternate method is designed to reduce the amount of energy required for operating the WAMD system and reduce the exposure to electromagnetic waves, as the HMFG is only operated when a suspicious individual is already located, not constantly as in the first method described above.

Figure 7:
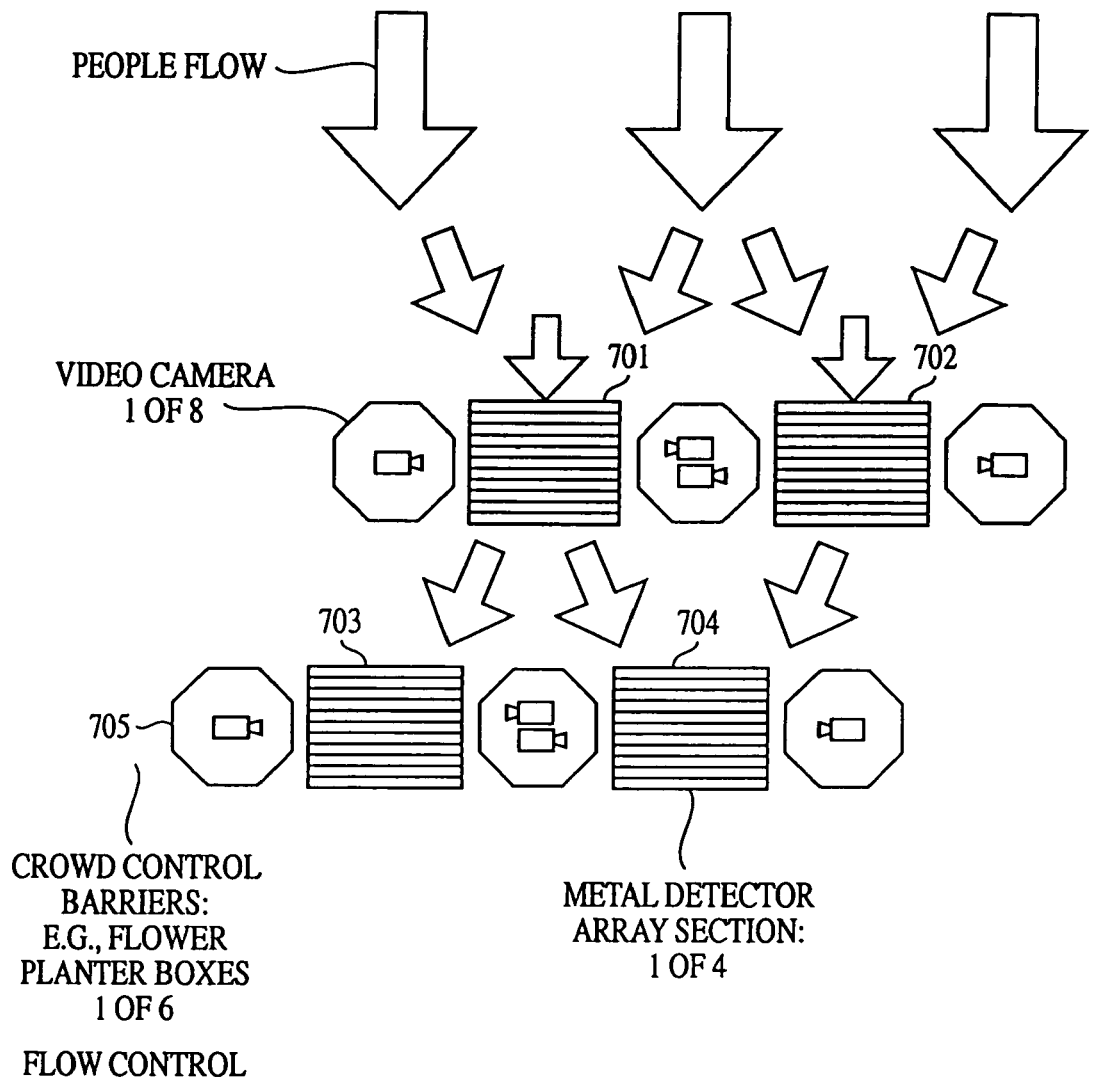
FIG. 7 is a diagram illustrating a concept of controlled flow and a placement of a metal detection system and video cameras.

In some applications, it may be preferred to have more control over the flow of people through the survey area. FIG. 7 is a diagram illustrating a concept of controlled flow and the placement of the metal detection system and video cameras. The flow of people is channeled over the metal detectors 701–704 by a series of crowd control barriers 705. For aesthetic reasons, the barriers could be columns, flowerbeds or planters.

Figure 8:
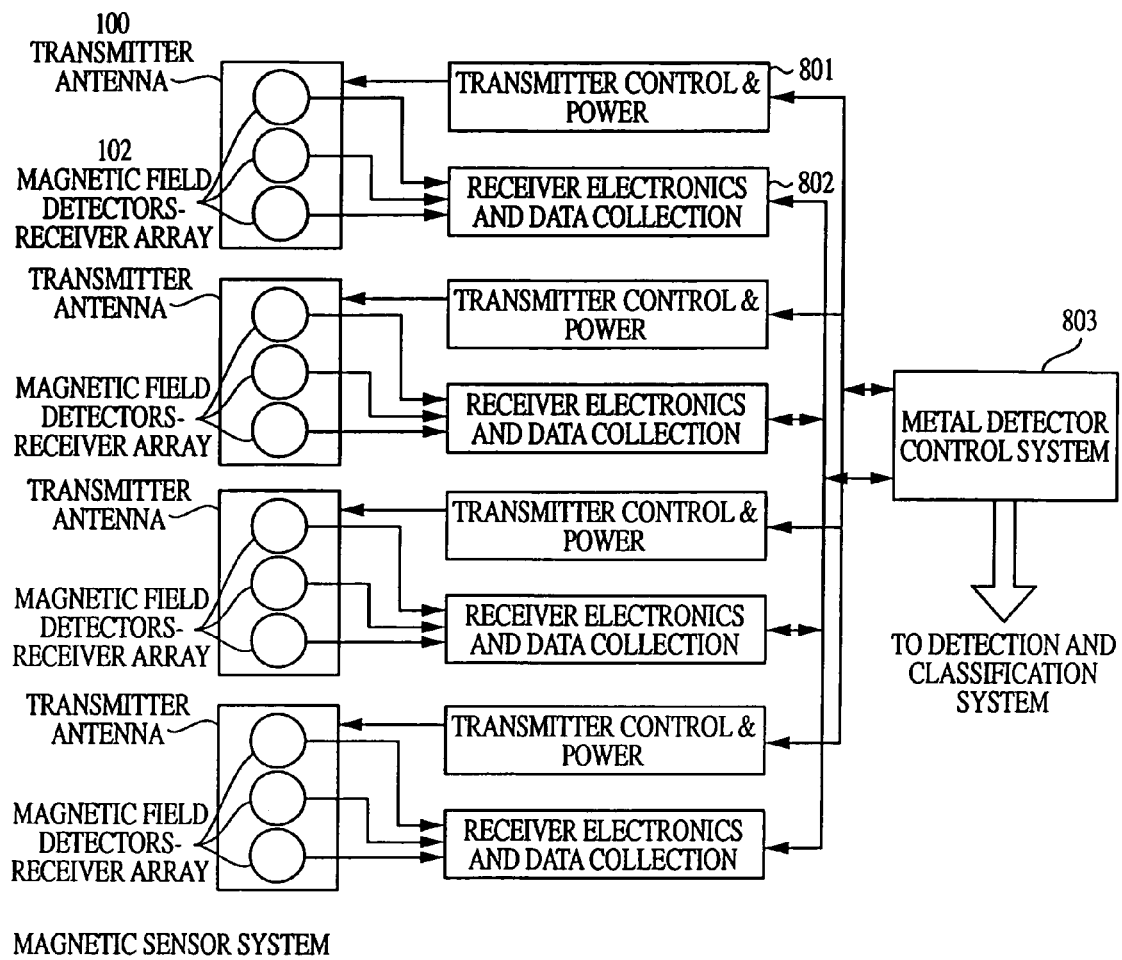
FIG. 8 is a diagram illustrating a simplified block diagram of the metal detection system illustrated in FIG. 7.

FIG. 8 is a diagram illustrating a simplified block diagram of the metal detection system illustrated in FIG. 7. FIG. 8 illustrates the system broken into multiple metal detection subsystems, one for each of the metal detectors 701–704, each including a transmitter and receiver array. This enables the system to be easily scaled to the size of the survey area. Each subsystem metal detector can cover many square meters of area.

In FIG. 8, the transmitter control and power subcomponents 801 activate the transmitter coil with the proper waveform (e.g., pulse, frequency or ramp), power (current) level, and duty cycle. The receiver subcomponents 802 contain amplifiers, filters and signal digitizers. The metal detector control system 803 interfaces the metal detectors to the rest of the system. Data from the receivers 802 are analyzed for the detection of metal. Once metal is detected (some minimum threshold exceeded), the control system may adjust its operating parameters for optimal target classification (see application Ser. No. PCT/US01/13933, filed Apr. 30, 2002, which is hereby incorporated herein by reference in its entirety). Once metal is detected, the strength of the "contact" and the location of the contact are passed to the main control system that then activates an alarm system. The alarm cues the system operator and video camera to view the area that is related to the contact.

To summarize, the WAMD of the present invention senses abnormal metal signatures (those associated with metal weapons) and alerts the system operator. A system operator will use a video camera system to zoom in on the potential threat area (this may be performed automatically by implementing software control). If a magnetic signature threat correlates with a visual inspection of the person, then a security person in the monitoring area is directed to the person(s) in question for further investigation or further screening with a portable metal detector or a handheld metal detector. For example, FIG. 1B illustrates a weapon being carried in a bag. However, as another example, if the WAMD gives an alert indicating the presence of a metal object, but the visual inspection reveals that a wheelchair (or other large metal object) was detected, the operator can determine that there may be no need for further investigation.

In an alternative method for using the WAMD system, the operator monitors the crowd of people visually or with the video camera system, and then activates the WAMD only when the operator locates a possible threat, thereby scanning a suspicious individual for metal objects.

While the invention has been shown and described with references to certain preferred embodiments thereof, it will be understood by those skilled in the art that various changes in form and details may be made therein without departing from the spirit and scope of the invention as defined by the appended claims.

What is claimed is:

1. A Wide Area Metal Detection (WAMD) system for security screening a crowd of people, the system comprising:
   at least one Magnetic Field Generator (MFG) located below a walking surface for generating a magnetic field;
   a plurality of magnetic field sensors located within the sensing area of the MFG for sensing a metallic object;
   a location indicator for indicating a location of an individual with the metallic object at a position corresponding to that of one of the plurality of magnetic field sensors that sensed the metallic object;
   at least one video camera for identifying the individual at the location indicated by the location indicator and tracking further movements of the individual; and
   a video display for displaying images captured by the at least one video camera to security personnel.

2. A Wide Area Metal Detection (WAMD) system for security screening a crowd of people, the system comprising:
   at least one Magnetic Field Generator (MFG) located below a walking surface for generating a magnetic field;
   a plurality of magnetic field sensors located within the sensing area of the MFG for sensing a metallic object; and
   a location indicator for indicating a location of an individual with the metallic object at a position corresponding to that of one of the plurality of magnetic field sensors that sensed the metallic object;
wherein the plurality of magnetic field sensors sense the metallic object by sensing an eddy current generated by the metallic object.

3. The WAMD system of claim 2, further comprising a data processing unit for processing the sensed eddy current to determine whether the metallic object is a possible weapon.

4. A Wide Area Metal Detection (WAMD) system for security screening a crowd of people, the system comprising:
   at least one Magnetic Field Generator (MFG) located below a walking surface for generating a magnetic field;
   a plurality of magnetic field sensors located within the sensing area of the MFG for sensing a metallic object;
   a location indicator for indicating a location of an individual with the metallic object at a position corresponding to that of one of the plurality of magnetic field sensors that sensed the metallic object; and
   a non-magnetic surface marked with a grid pattern covering the plurality of magnetic field sensors to assist in locating and apprehending the individual;
wherein the plurality of magnetic field sensors are located below the walking surface.

5. The WAMD system of claims 1, 2, or 4 wherein the at least one MFG is a Horizontal Magnetic Field Generator (HMFG).

6. A Wide Area Metal Detection (WAMD) method for security screening a crowd of people, the method comprising:
   directing a traffic pattern of the crowd over at least one Magnetic Field Generator (MFG) and by a plurality of magnetic field sensors;
   detecting a presence of a metal object in the crowd utilizing the at least one MFG and one of the plurality of magnetic field sensors;
   locating an individual in the crowd with the metal object utilizing a location indicator; and
   apprehending the individual to perform a more thorough body search and examine the metal object.

7. The WAMD method of claim 6, further comprising:
   identifying the individual in the crowd with at least one video camera, after locating the individual; and
   tracking movement of the individual with the at least one video camera until the individual is apprehended.

8. The WAMD method of claim 6, wherein the MFG is a Horizontal Magnetic Field Generator (HMFG).

9. The WAMD method of claim 6, wherein the location indicator locates the individual at a position corresponding to that of the one of the plurality of magnetic field sensors.

10. The WAMD method of claim 6, wherein directing the traffic pattern of the crowd over the at least one MFG is performed using physical barriers.

11. The WAMD method of claim 6, further comprising tracking movement of the individual with the location indicator until the individual is apprehended.

12. The WAMD method of claim 6, wherein the plurality of magnetic field sensors is located below the traffic pattern of the crowd and the at least one MFG and the plurality of magnetic field sensors are covered with a non-magnetic surface including a grid pattern to assist in locating the individual.

13. The WAMD method of claim 6, wherein the one of the plurality of magnetic field sensors detects the metal object by sensing an eddy current generated by the metal object over the at least one MFG.

14. The WAMD method of claim 13, further comprising utilizing the sensed eddy current to determine whether the metal object is a weapon.

15. A Wide Area Metal Detection (WAMD) method for security screening a crowd of people, the method comprising:
   directing a traffic pattern of the crowd over at least one Magnetic Field Generator (MFG) and by a plurality of magnetic field sensors;
   monitoring the crowd for target individuals, utilizing at least one video camera;
   upon identification of a target individual, activating the at least one MFG below the target individual;
   determining if a metal object is on the target individual, utilizing the at least one MFG and one of the plurality of magnetic field sensors; and
   apprehending the individual to perform a more thorough body search and examine the metal object, if the object is on the target individual.

16. The WAMD method of claim 15, further comprising tracking movement of the individual, utilizing the at least one video camera, until the individual is apprehended.

17. The WAMD method of claim 15, further comprising tracking movement of the individual, utilizing a location indicator, until the individual is apprehended.

18. The WAMD method of claim 15, wherein the plurality of magnetic field sensors is located below the traffic pattern of the crowd and the at least one MFG and the plurality of magnetic field sensors are covered with a non-magnetic surface including a grid pattern to assist in apprehending the individual.

19. The WAMD method of claim 15, wherein the one of the plurality of magnetic field sensors detects the metal object by sensing an eddy current generated by the metal object over the at least one MFG.

20. The WAMD method of claim 19, further comprising utilizing the sensed eddy current to determine whether the metal object is a weapon.

21. The WAMD method of claim 15, wherein the at least one MFG is a Horizontal Magnetic Field Generator (HMFG).

* * * * *